(12) United States Patent
Sivak

(10) Patent No.: US 9,707,483 B2
(45) Date of Patent: *Jul. 18, 2017

(54) APPARATUS, METHOD AND COMPUTER READABLE STORAGE MEDIUM FOR COLLECTING DOOBERS IN AN ELECTRONIC GAME

(71) Applicant: Zynga Inc., San Francisco, CA (US)

(72) Inventor: Seth John Sivak, Cambridge, MA (US)

(73) Assignee: Zynga Inc., San Francisco, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/718,061

(22) Filed: May 20, 2015

(65) Prior Publication Data

US 2015/0251096 A1  Sep. 10, 2015

Related U.S. Application Data

(63) Continuation of application No. 13/731,678, filed on Dec. 31, 2012, now Pat. No. 9,050,530.

(60) Provisional application No. 61/581,484, filed on Dec. 29, 2011.

(51) Int. Cl.
| | |
|---|---|
| G06F 17/00 | (2006.01) |
| A63F 13/422 | (2014.01) |
| A63F 13/20 | (2014.01) |
| A63F 13/23 | (2014.01) |
| A63F 13/53 | (2014.01) |
| A63F 13/837 | (2014.01) |
| A63F 13/822 | (2014.01) |
| A63F 13/335 | (2014.01) |

(52) U.S. Cl.
CPC ............ *A63F 13/422* (2014.09); *A63F 13/20* (2014.09); *A63F 13/23* (2014.09); *A63F 13/53* (2014.09); *A63F 13/837* (2014.09); *A63F 13/335* (2014.09); *A63F 13/822* (2014.09); *A63F 2300/308* (2013.01); *A63F 2300/6054* (2013.01); *A63F 2300/807* (2013.01); *A63F 2300/8076* (2013.01)

(58) Field of Classification Search
USPC ......................................... 463/1, 5–7, 30–34
See application file for complete search history.

(56) References Cited

U.S. PATENT DOCUMENTS

| | | | | |
|---|---|---|---|---|
| 2012/0239560 | A1* | 9/2012 | Pourfallah | G06Q 10/00 705/40 |
| 2014/0024449 | A1* | 1/2014 | Fox | A63F 13/12 463/31 |
| 2014/0206452 | A1* | 7/2014 | Bambino | A63F 13/00 463/40 |

* cited by examiner

*Primary Examiner* — Ronald Laneau
(74) *Attorney, Agent, or Firm* — Martine Penilla Group, LLP

(57) ABSTRACT

An apparatus, method and computer-readable storage medium for efficiently collecting doobers. A game area may be presented in a graphical user interface on a display device. The game area may include a game character associated with a first player, regions and objects within the regions. The character may move within the regions and interact with the objects. One or more doobers may be presented in the game area, and the doober(s) may be identified as collected by the first player in response to one or more inputs to the graphical user interface by the first player. The doober(s) may be marked as collected if an input is within a particular distance from the doober(s).

12 Claims, 5 Drawing Sheets

APPARATUS, METHOD AND COMPUTER READABLE STORAGE MEDIUM FOR COLLECTING DOOBERS IN AN ELECTRONIC GAME

CLAIM OF PRIORITY

This application is a Continuation Application under 35 USC § 120 and claims priority from U.S. patent application Ser. No. 13/731,678, entitled "Apparatus, Method and Computer Readable Storage Medium for Collecting Doobers in an Electronic Game", filed on Dec. 31, 2012, which further claims benefit of U.S. Provisional Patent Application No. 61/581,484, filed Dec. 29, 2011, the disclosure of which is herein incorporated by reference in their entireties.

FIELD

The presently disclosed embodiments relate to interactive data presentation, for example, during computer game play.

BACKGROUND

Interactive computer games hosted on a computer in which a player interacts with the computer through a graphical user interface are known. Examples of games may include Frontierville from Zynga, the assignee of the present application. The presentation of a game on the computer device may include a graphical user interface that provides a game board in which an avatar, or a character representing a player, performs tasks. As part of the game, the avatar may perform actions similar to a human, such as walking, picking up an object, and traveling through the game board. The avatar may perform these actions in response to inputs to the computer or graphical user interface or both made by a player. During game play, the player may be awarded a visual representation of a reward in the game called a doober. The doober may be collected by the player by inputs to the computer or graphical user interface. Traditional computer games require a player to perform multiple actions or complex actions to collect a doober. Thus, there exists a need for ways to collect doobers in an efficient manner.

DETAILED DESCRIPTION

Embodiments may be discussed herein to efficiently collect doobers in an electronic game. In an embodiment, an electronic game apparatus may be provided for efficiently collecting doobers. The apparatus may include a graphical user interface to receive and respond to player inputs and present data to a first player; a display device to present the graphical user interface; and a processor that executes computer instructions for responding to player inputs and manipulating the presentation of data in the graphical user interface and causing the presentation of the data on the display device. The processor may be configured to present a game window in the graphical user interface on the display device. The game window may include a game character associated with the first player, regions and objects within the regions. The character may move within the regions and interact with the objects. The processor may also be configured to present one or more doobers in the game window, and the processor may be configured to mark the doober(s) as collected by the first player in response to one or more inputs to the graphical user interface by the first player. A doober may be marked as collected if an input moves a cursor within a particular distance from the doober.

Another embodiment provides a method for performing the steps executed by the previously described apparatus for efficiently collecting doobers in an electronic game.

Another embodiment provides a computer readable medium containing computer readable program instructions that when executed by a processor performs the previously described method for efficiently collecting doobers in an electronic game.

Figure 1:
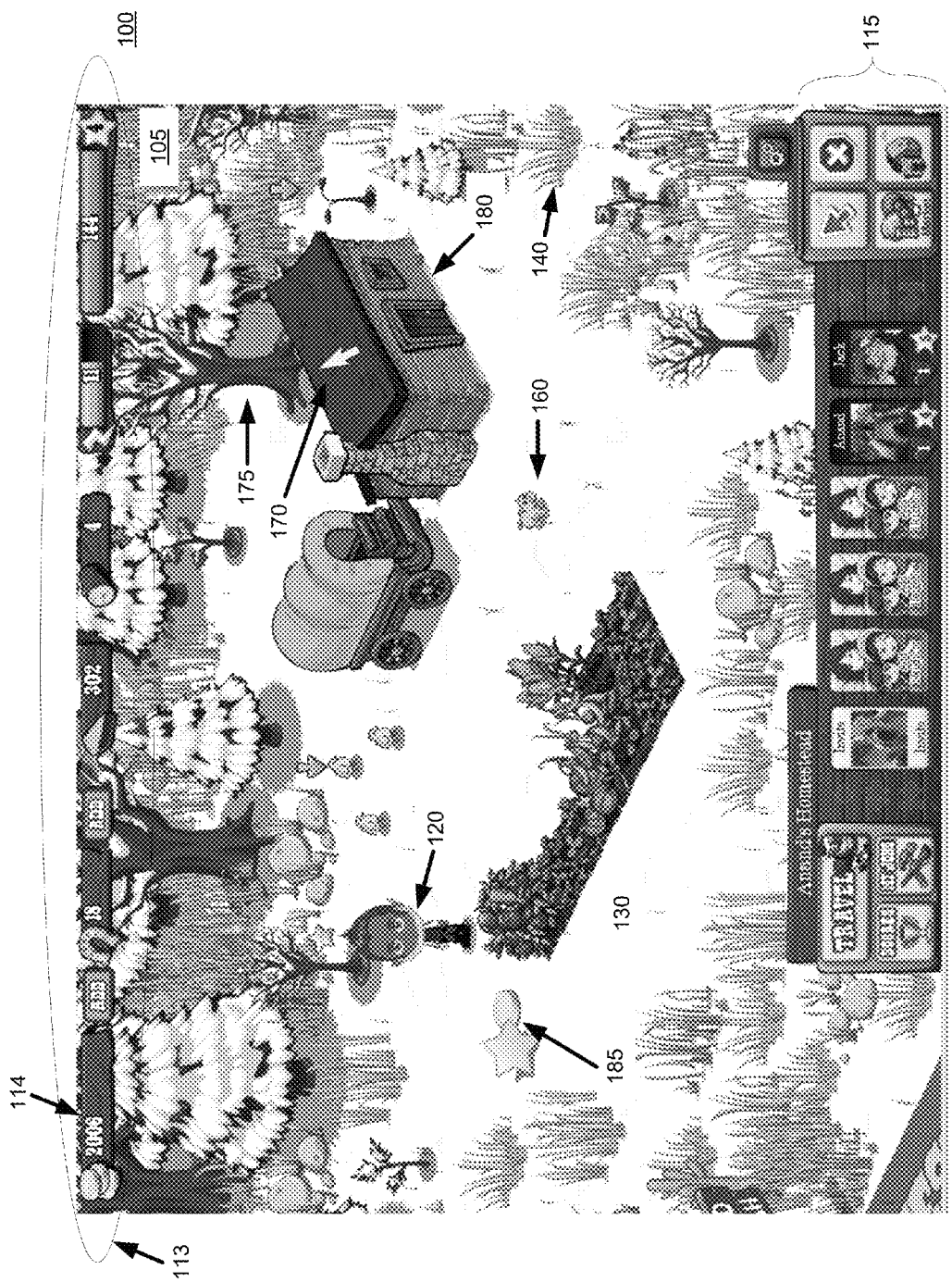
FIG. 1 illustrates an exemplary view of a graphical user interface according to an embodiment of the present invention.

FIG. 1 illustrates an exemplary view of a graphical user interface according to an embodiment of the present invention. The graphical user interface (GUI) 100 may be presented on a display device, e.g., computer monitor, tablet computer, television. The graphical user interface 100 may present a game board 105 that is an environment with which an avatar 120 interacts. For example, FIG. 1 shows an frontier-themed game board environment. Other themes, such as the "wild west," underwater, extraterrestrial, archeological, fantasy-oriented themed game board environments may also be used. In addition, the GUI 100 may include tabs (not shown) for navigating between different game screens. The avatar 120 may be a character representation of a player, and may respond to inputs to the GUI 100. The game board 105 may include indicators, such as a task list (not shown), tool kits 115, game progress indicators 113. No matter the theme of the game board, the game boards, including game board 105, may have in addition to an avatar 120, paths 130 for traveling around the game board 105, and objects 140 and 160. Objects may include obstacles, such as bushes, or traps, such as a banana peel that may cause the avatar 120 to slip. Objects may also include animals, plants, and structures that the avatar may interact with. Obstacle objects 140 may be removed by the player by commanding the avatar 120 to perform some action. For example, the player may select a tool from the tool kit 115, and the avatar 120, in response to player inputs to the GUI 100, may clear the bushes (obstacle object 140) that block a path. A task list may present a number of tasks that are to be performed by the player via the avatar 120 during game play. Some of the tasks in the task list, e.g., feed the cute piglet 160, may be easily accomplished by the player, while others may be more challenging.

Inputs to GUI 100 which control the avatar 120 and other objects in the game may be via an input device such as a keyboard, a mouse device, or a combination of both. For example, the player may use a mouse device which controls a cursor (for example, a mouse pointer) 170 to move the cursor to a particular location on the GUI 100, and click one or more buttons on the mouse to select an object and then control that object. For example, in an embodiment, the player may use a mouse device to move cursor 170 to avatar 120 to select the avatar 120, and then move the cursor over an object such as the piglet 160, and click on the piglet 160 to instruct the avatar to feed the piglet 160. In another embodiment, the player may use a mouse device to move cursor 170 to avatar 120 to select the avatar 120, and then press one or more keys on a keyboard device to instruct the avatar 120 to perform an action or a task.

During game play, the player may be awarded points and/or rewards for completing tasks or successfully interacting with certain objects in order to complete tasks. For example, in an embodiment, a task may be presented to the player to build an extension to the house 180. In order to do so, the avatar 120 may have to cut down a tree 175 to obtain lumber required to build the extension. If the player successfully cuts down the tree 175 and obtains lumber, the player may be given a reward such as points or money. These rewards may be used by the player to obtain objects in the game to enhance the game play experience (for example, a new outfit for the avatar) or to obtain objects to advance the player in the game (for example, a tool that helps the avatar complete tasks, or complete tasks quicker). In an embodiment, rewards/points may automatically accumulate when a player completes a task or interacts with an object.

In an embodiment, a reward may appear on the GUI 100 as a visual representation of the reward 185, but the player may not benefit from the reward until the player collects or acquires the visual representation of the reward 185. The visual representation of the reward may be called a doober. For example, the doober 185 may be game play money which may be used by the player to obtain tools or materials in the game. In an embodiment, the visual representation of the money 185 will not be added to the player's overall accumulated money 114 in the game unless the player acquires the doober. For example, the overall accumulated money 114 may increase from 2006 to 2007 once the player acquires the doober 185. In order to acquire the doober, the player may have to perform one or more actions. In an embodiment, to acquire the doober, the player may move the avatar 120 close to the location of the doober. In a further embodiment, the player may move cursor 170 via a mouse device to the doober 185 and click a button on the mouse device.

In the above exemplary embodiments, the player has to execute more than one action, or a complex action, in order to collect the doober 185. It may be advantageous for the player to acquire the doober with a single action, or one or more simple actions. Accordingly, in an embodiment, the player may move cursor 170 via a mouse device to the doober 185, and may automatically accumulate the reward when the cursor touches the doober 185. This may be referred to as a mouseover. In an embodiment, the player only needs to move the cursor within a distance threshold from the doober 185 to accumulate the reward.

Figure 2:
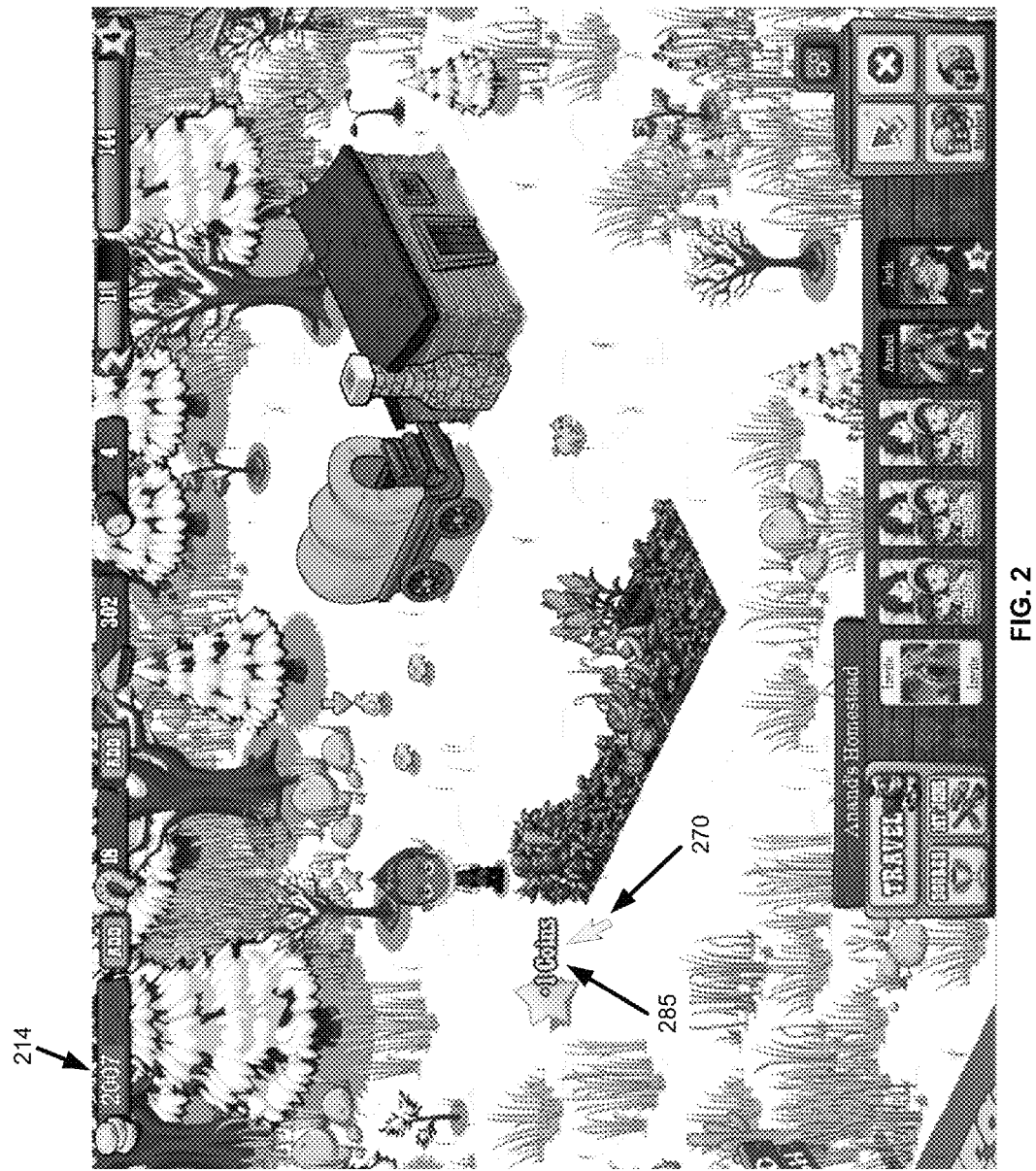
FIG. 2 illustrates an exemplary view of a graphical user interface after acquiring a doober according to an embodiment of the present invention.

FIG. 2 illustrates an exemplary view of a graphical user interface after acquiring a doober according to an embodiment of the present invention. FIG. 2 shows the game board 105 (from FIG. 1) after the doober 185 is acquired by touching the doober 185 with cursor 270. The doober 185 may disappear as soon as cursor 270 touches the doober 185, and the reward accumulated by the player may be incremented. For example, the number of coins accumulated by the player may be incremented from 2006 to 2007 (214) as a result of acquiring the doober 185. Acquiring the doober 185 may also be accompanied by a notice 285 on the GUI indicating to the player that doober 185 has been acquired. For example, the notice 285 indicates that +1 coins were gained.

Figure 3:
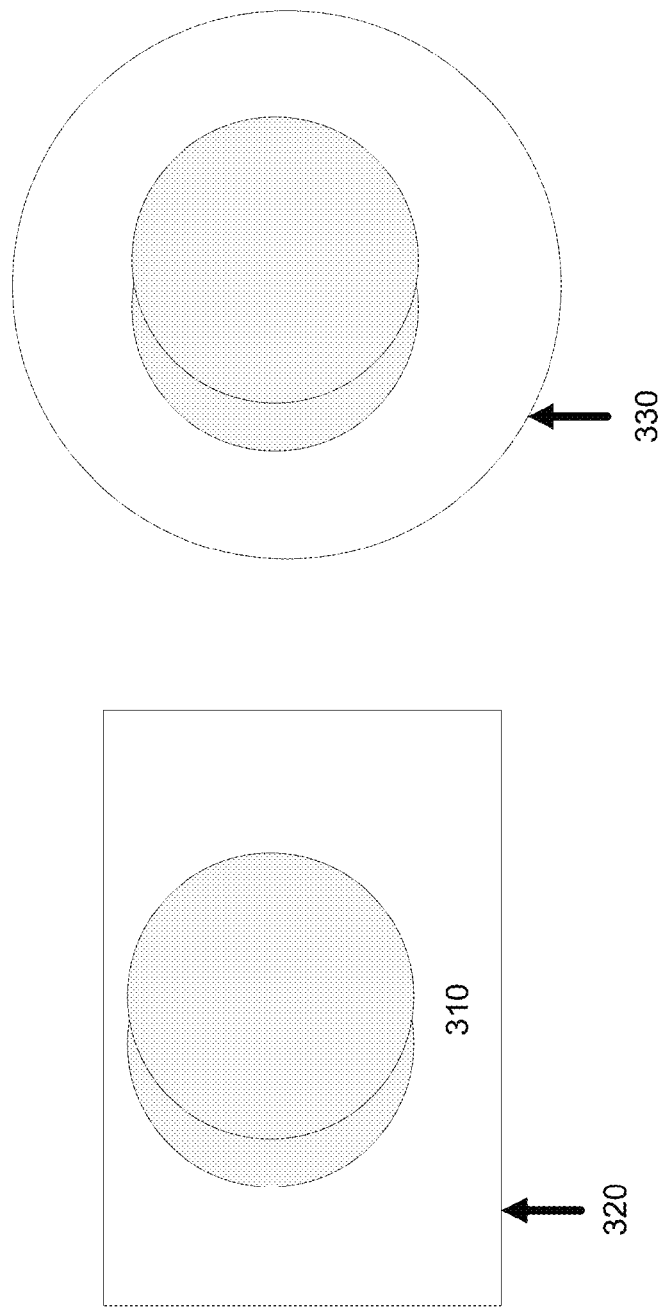
FIG. 3 illustrates a doober and an acquire space around a doober in an exemplary embodiment of the present invention.

FIG. 3 illustrates a doober and an acquire space around a doober in an exemplary embodiment of the present invention. FIG. 3 shows an overhead view of an exemplary doober 310. The exemplary doober is shown in the form of two coins, but a person having ordinary skill in the art will appreciate that the doober may take any visual representation form. In an embodiment, a player may need to move a cursor until the cursor touches the outline of the doober 310 in order to acquire the doober. In another embodiment, a player only needs to move the cursor until the cursor touches the outline of the space surrounding the doober 320 to acquire the doober. This space may be referred to as the doober acquire space. The doober acquire space may be defined by various spatial parameters. For example, the doober acquire space may be take any shape including a rectangular area 320 or a circular area 330. The doober acquire space does not necessarily have to be symmetrical, and can be irregularly shaped. Although FIG. 3 has been illustrated with 2-dimensional drawings, the principles discussed in FIG. 3 are applicable to games which render graphics in a 3-dimensional space. Specifically, doober 310 may occupy 3-dimensions, and doober acquire space 320 may be a 3-dimensional rectangular cube encapsulating 3-dimensional doober 310. Similarly, a 3-dimensional sphere 330, may encapsulate a doober. When a cursor touches the 3-dimensional space which encapsulates the doober, the doober may be acquired.

Figure 4:
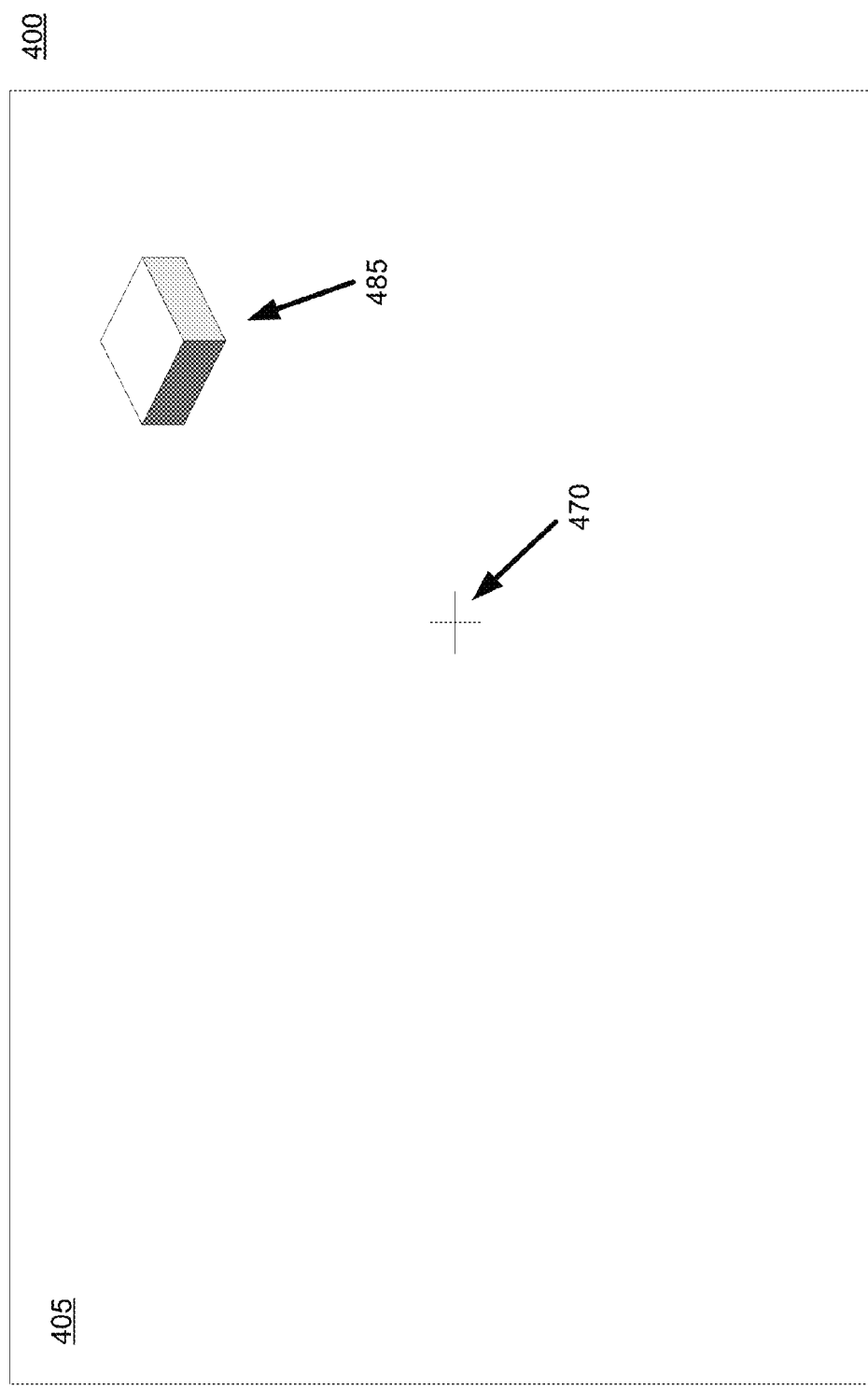
FIG. 4 illustrates acquiring a doober in a first person shooter electronic game in an exemplary embodiment of the present invention.

FIG. 4 illustrates acquiring a doober in a first person shooter electronic game in an exemplary embodiment of the present invention. Examples of first person shooter games are Doom, Half Life, Halo, and Modern Warfare. The graphical user interface (GUI) 400 may be presented on a display device, e.g., computer monitor, tablet computer, television. The graphical user interface 400 may present a 3-dimensional game view 405 of an environment in which a player interacts with game objects and game characters. The player views the game from a first person perspective of an associated character within the game. I.e., the player views the game through the eyes of the character and can interact with the game environment by manipulating the character through inputs via input devices such as a mouse, keyboard, or a joystick. The crosshair 470 shows the position of a cursor (for example, a mouse pointer), and controls the direction in which the character's eyes are directed. The player can control the view on the GUI 400, by moving the cursor. The player may also control the movement of his/her associated character via an input device such as a keyboard or a joystick. As the character moves (for example, walks or runs) in the game, the point of view of the character, and consequently the image displayed on the GUI 400, changes.

A doober 485 may be presented in a first person shooter video game. The doober 485 may be a visual representation of an object that is beneficial to the character associated with the player. For example, in an exemplary military themed game, the doober 485 may be a weapon, ammo, health, or a shield. In traditional first person shooter games, the player has to move the character to the location of the doober 485 in order to acquire the doober 485. In addition, the player may have to press a button to acquire the doober 485. Therefore, it is desirable to acquire the doober by minimizing the number of steps and/or effort. Accordingly, in an embodiment, the player may move cursor 470 via an input device to the doober 485, and may automatically acquire the doober 485 when the cursor touches the doober 485. In an embodiment, the player only needs to move the cursor within a distance threshold from the doober 485.

Although the above embodiments have been discussed in the context of online games with a game board and first person shooter games, a person having ordinary skill in the art will appreciate that the principles discussed are not restrictive and can be applied to any type of video game including third person shooters, tactical shooters, light-gun games, role-playing games, strategy games, simulation games, sports games, massively multiplayer online games, arcade games, and fighting games.

Figure 5:
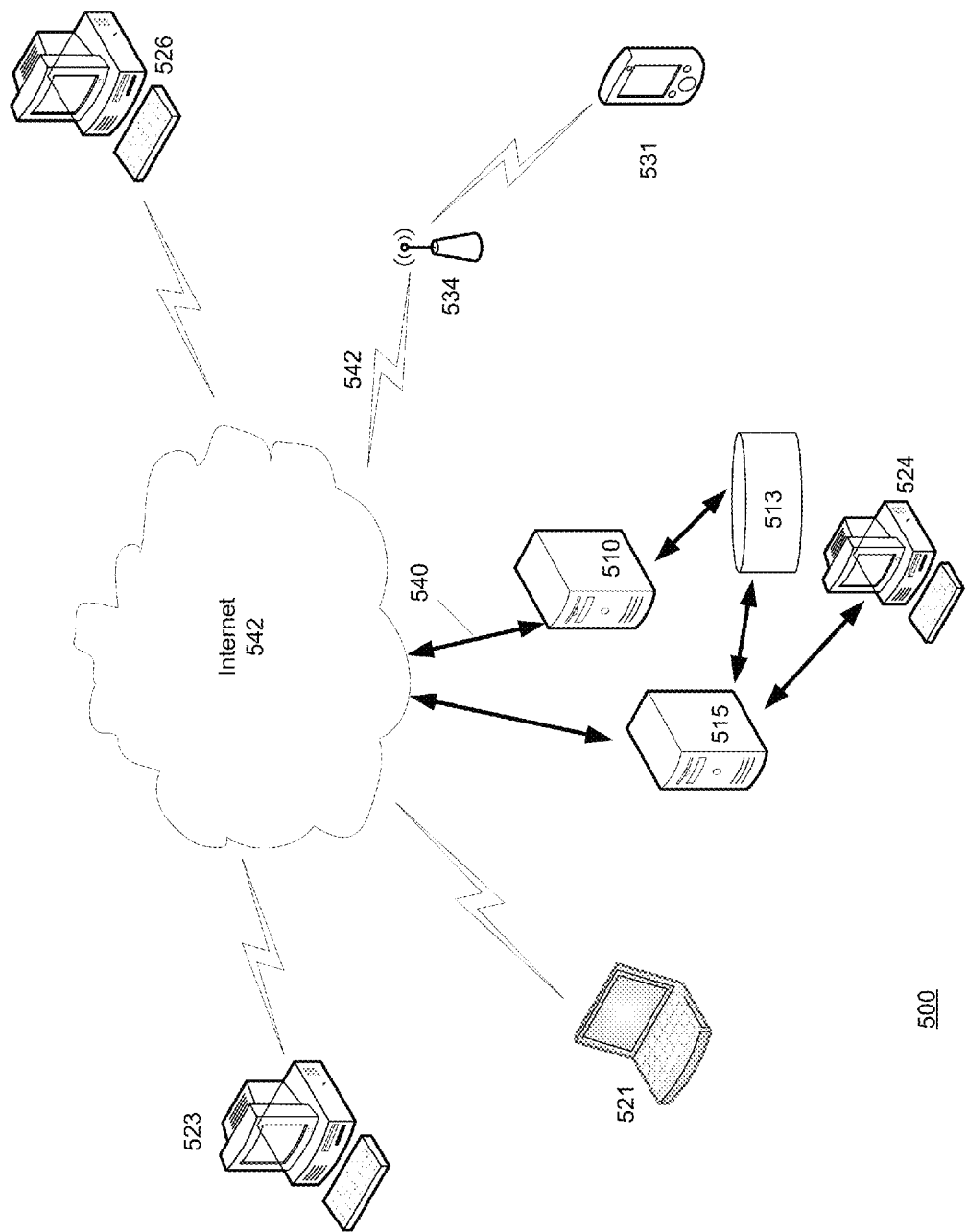
FIG. 5 illustrates an exemplary hardware configuration for implementing a system according to an embodiment of the present invention.

FIG. 5 illustrates an exemplary hardware configuration for implementing a system according to an embodiment of the present invention. The system 500 may comprise one or more networked servers 510 and 515, one or more player computers 521, 523, 524 and 526, data storage devices 513, wired and wireless communication links 540, 542, wireless access point 534, and portable device(s) 531. The one or more networked servers 510 and 515 may execute a multi-application software system that may include a web server, gaming software applications and social networking applications. The servers 510, 515 may include processor(s), internal memory and related computer program instructions (all not shown). The player computers 521, 523, 524, 526 may include a processor, display device, and data storage device, such as a hard disk (all not shown).

The server 510 and/or 515 may provide connectivity between the players' computers 521, 523, 524 and 526, and/or players' portable device(s) 531 over wired or wireless communication paths. The server 510 may access data storage device(s) 513 that store machine-readable software instructions for executing the described method which may be accessed and executed by the processor(s) of the server 510. The instructions for generating and presenting may be downloaded to players' computers 521, 523, 524 and 526, and/or players' portable device(s) 531 over wired or wireless communication paths. The game software may execute on the processors in the players' computers 521, 523, 524 and 526, and/or players' portable device(s) 531.

The data storage device(s) 513 also may store data related to the players for future use. The data storage device 513 that may be a hard disk drive, non-volatile memory, flash memory, or any suitable device for storing electronic data, and may be organized as a object-oriented or relational database.

The servers 510 and 515 may communicate with client terminal(s) 521, 523, 524, 526 and portable device(s) 531 via the internet 542. The player computers 521, 523, 524, 526 may include a processor, display device, and data storage device, such as a hard disk (all not shown). The client terminals 521, 523, 524, 526 may participate in execution of program instructions. The portable device 531 may be a smartphone, personal digital assistant, tablet, notebook or mini-notebook computer capable of wired and/or wireless communication. The portable device 531 may include memory, a processor, input device, display, and devices that enable wired or wireless communication.

Several embodiments of the present invention are specifically illustrated and described herein. Those skilled in the art may appreciate from the foregoing description that the present invention may be implemented in a variety of forms, and that the various embodiments may be implemented alone or in combination. In other instances, well-known operations, components and circuits have not been described in detail so as not to obscure the embodiments. It can be appreciated that the specific structural and functional details disclosed herein may be representative and do not necessarily limit the scope of the embodiments. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), Blu-ray Disc (BD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An electronic game apparatus comprising:
a graphical user interface to receive and respond to player inputs and present data to a first player;
a display device to present the graphical user interface; and a processor that executes computer instructions for responding to player inputs and manipulating the presentation of data in the graphical user interface and causing the presentation of the data on the display device, the processor configured to:
  process data to present a game area in the graphical user interface on the display device, the game area including a game character associated with the first player, wherein the character moves within regions in the game area and interacts with the objects in the regions;
  process data to present at least a doober in the game area; and
  process data to graphically identify the at least one doober as collected by the first player in response to at least an input to the graphical user interface by the first player, wherein the at least one input is made within a particular distance from the at least one doober, wherein the doober is rendered as a 3-dimensional object within the game area, and the at least one input is within the particular distance if the input is within a predefined 3-dimensional space encapsulating the doober.

2. The apparatus of claim 1, wherein the at least on input touches the at least one doober, and the apparatus is one of a computer, a smartphone, a tablet computer, or a personal digital assistant.

3. The apparatus of claim 1, wherein the electronic game is presented with an interface to a social network website.

4. The apparatus of claim 1, wherein the electronic game is a first person shooter.

5. A method in an electronic game system comprising:
  presenting a game area in a graphical user interface on a display device, the game area including a game character associated with the first player, regions and objects within the regions, wherein the character moves within the regions and interacts with the objects;
  presenting at least a doober in the game area; and
  identifying the at least one doober as collected by the first player in response to at least an input to the graphical user interface by the first player, wherein the at least one input occurs when the input is provided within a particular distance from the at least one doober, wherein the doober is rendered as a 3-dimensional object within the game area, and the input is within the particular distance if the input is within a predefined 3-dimensional space encapsulating the doober.

6. The method of claim 5, wherein the input touches the at least one doober, and the display device is associated with one of a computer, a smartphone, a tablet computer, or a personal digital assistant.

7. The method of claim 5, wherein the electronic game is presented via a social network website or with an interface to the social network website.

8. The method of claim 5, wherein the electronic game is a first person shooter.

9. A non-transitory computer-readable storage medium embodied with program instructions for causing a processor to execute a method in an electronic game system, the executed method comprising:
  presenting a game area in a graphical user interface on a display device, the game area including a game character associated with the first player, regions and objects within the regions, wherein the character moves within the regions and interacts with the objects;
  presenting at least a doober in the game area; and
  identifying the at least one doober as collected by the first player in response to at least an input to the graphical user interface by the first player, wherein the at least one input occurs when the input is provided within a particular distance from the at least one doober, wherein the doober is rendered as a 3-dimensional object within the game area, the input is within the particular distance if the input is within a predefined 3-dimensional space encapsulating the doober.

10. The computer-readable storage medium of claim 9, wherein the input touches the at least one doober, and the display device is associated with one of a computer, a smartphone, a tablet computer, or a personal digital assistant.

11. The computer-readable storage medium of claim 9, wherein the electronic game is presented via a social network website or with an interface to the social network website.

12. The computer-readable storage medium of claim 9, wherein the electronic game is a first person shooter.

* * * * *